United States Patent
Moretto

(10) Patent No.: US 7,384,018 B2
(45) Date of Patent: Jun. 10, 2008

(54) DEVICE FOR FIXING PIPES TO SUPPORTING STRUCTURES

(75) Inventor: Renato Moretto, Massanzago (IT)

(73) Assignee: Moretto S.p.A., Massanzago (IT)

( * ) Notice: Subject to any disclaimer, the term of this patent is extended or adjusted under 35 U.S.C. 154(b) by 0 days.

(21) Appl. No.: 11/480,358

(22) Filed: Jul. 5, 2006

(65) Prior Publication Data
US 2007/0040075 A1     Feb. 22, 2007

(30) Foreign Application Priority Data
Aug. 5, 2005    (IT) ................... PD2005A0248

(51) Int. Cl.
*F16L 3/08*    (2006.01)
(52) U.S. Cl. .................................. 248/74.1
(58) Field of Classification Search ........... 248/74.1, 248/68.1, 65, 73, 219.3, 219.4
See application file for complete search history.

(56) References Cited

U.S. PATENT DOCUMENTS

| | | | |
|---|---|---|---|
| 4,479,625 A * | 10/1984 | Martz ................ | 248/74.1 |
| 5,533,696 A * | 7/1996 | Laughlin et al. ........... | 248/74.2 |
| 6,494,415 B1 * | 12/2002 | Roth ...................... | 248/74.1 |
| 6,899,305 B2 * | 5/2005 | Korczak et al. .......... | 248/68.1 |
| 2004/0200936 A1 * | 10/2004 | Opperthauser ............ | 248/62 |
| 2005/0109887 A1 * | 5/2005 | Catapano ................ | 248/68.1 |
| 2005/0121559 A1 * | 6/2005 | King ..................... | 248/68.1 |
| 2006/0249634 A1 * | 11/2006 | Van Walraven ............ | 248/71 |

* cited by examiner

*Primary Examiner*—Ramon O Ramirez
(74) *Attorney, Agent, or Firm*—Modiano & Associati; Albert Josif; Daniel J. O'Byrne

(57) ABSTRACT

A device for fixing pipes to supporting structures, comprising two C-shaped circular strips mutually oppositely coupled so as to surround mutually opposite portions of a pipe to be fixed to the supporting structure, and a fixing bracket, which is provided with two mutually opposite cantilevered wings. Respective first ends of the circular strips are engaged on the facing portions of the free ends of the two cantilevered wings. Protruding teeth are provided on each of the first ends, arranged in abutment against a corresponding engagement portion provided on a respective cantilevered wing.

8 Claims, 3 Drawing Sheets

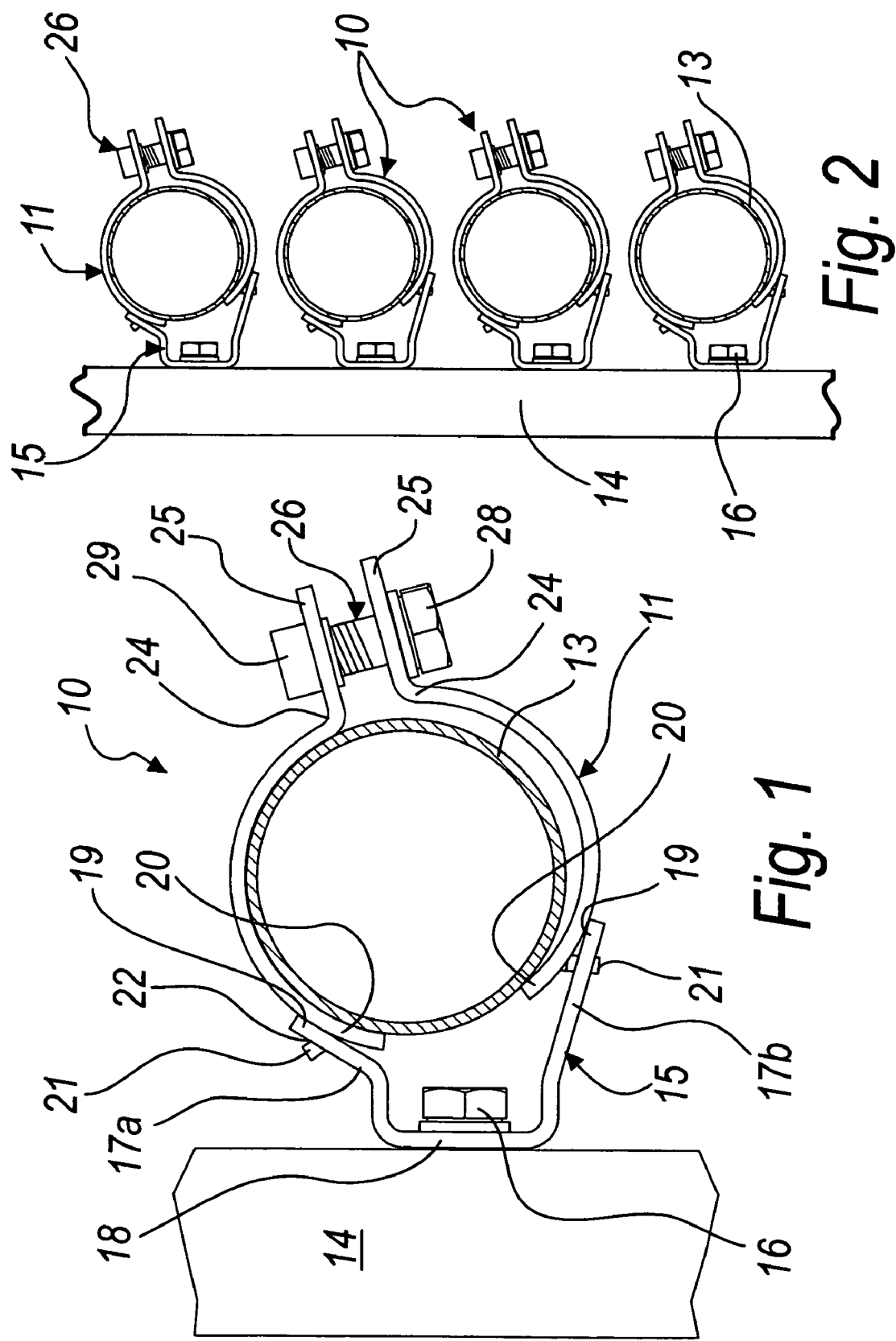

DEVICE FOR FIXING PIPES TO SUPPORTING STRUCTURES

The present invention relates to a device for fixing pipes to supporting structures.

BACKGROUND OF THE INVENTION

As it is known, in the production of industrial plants there is often the need to provide lines for conveying material that is useful for the most disparate applications, including the conveyance of supply or discharge water, the conveyance of compressed air, the conveyance of liquids for cooling, the conveyance of food liquids, the conveyance of powders and granules, et cetera.

Of course, depending on the use, the materials of the pipes are the most suitable for the requirements; pipes made of plastics, galvanized steel, stainless steel and other disparate materials are typically used.

These pipes must be fixed to the structures of the plant by virtue of adapted elements, which allow to secure each pipe in one point so as to be able to restrain it.

The most widely used pipe fixing devices are divided substantially into two categories: a profile compression collar and a bracelet collar.

The compression collar is a collar formed by two perfectly identical strips, which are shaped like a circular arc along one portion and are straight at an end portion.

The pipe is rested, for example horizontally, on an upright and the two strips are coupled so as to face each other and surround, with their straight portions, the lateral part of the pipe, while the circular arc-like parts adapt to the portion of the pipe that is directed in the opposite direction with respect to the upright.

Two respective holes for the insertion of a locking bolt are provided in the outer ends of the strips, while the opposite ends of the strips have a T-shaped contour for insertion in a complementary vertical guide provided on the upright.

The pipe is secured because the pipe in practice is compressed by the circular arc-like portions toward the upright.

In the case of thin pipes, the pipe is squeezed in the portion of contact with the upright, causing an internal bulge.

This bulge in practice tends to obstruct the pipe partially; in the case of a flow of solid particles which can flow therein, such as for example granules of plastic material loaded with glass fiber, the granules strike the bulge, producing in the long term, due to an abrasive effect, a laceration of the pipe in the point of impact.

Another problem linked to this type of fixing collar is related to the fact that when it is necessary to fix a plurality of pipes close to each other in parallel, the closure bolt of the strips is positioned awkwardly.

The axis of said bold is in fact oriented parallel to the wall (in the typical case of the upright adjacent to the wall), so that when the pipes are mutually close, the fixing devices also are mutually close and there is no space between one and the other for easy front insertion of the head of a power screwdriver (or equivalently of a socket wrench).

Moreover, with a collar of this type, the alignment of the pipe occurs with difficulty, since said collar is fixed on the upright only when the pipe presses on said upright; it is therefore difficult to align the pipes correctly.

Further, the fact that securing the pipe corresponds to its fixing to the upright prevents said pipe from being moved or turned conveniently, for example to connect it to another pipe.

Some of the drawbacks observed in the use of the compression collar are overcome by the bracelet collar.

Said bracelet collar is constituted by two C-shaped strips, which oppositely surround the pipe and secure it.

A bolt for securing to said upright protrudes from the bottom of one of the strips.

Perforated flat portions are present on both ends of each strip, are arranged parallel to the wall, and are useful for the insertion of a bolt for fixing to the other strip.

In this case, the axis of the additional bolts is perpendicular to the wall.

This type of collar allows convenient access to the strip fixing bolts; they are in fact oriented at the front and therefore, in the case of side-by-side pipes, access to said bolts is not prevented by the nearby collar.

Likewise, it is possible to fix the pipes to the uprights without securing them completely, thus allowing their translational motion or rotation before their final securing.

However, with this type of collar, when it is necessary to have a plurality of pipes arranged side-by-side and parallel, said pipes are scarcely compact, since they are necessarily spaced by the width of the perforated flat portions.

SUMMARY OF THE INVENTION

The aim of the present invention is to solve the drawbacks noted in known types of pipe fixing collar.

Within this aim, an object of the present invention is to provide a device for fixing pipes to supporting structures that can perform effective securing without deforming the pipes to which it is applied.

Another object of the present invention is to provide a device for fixing pipes to supporting structures that allows a compact arrangement of a plurality of pipes arranged in parallel.

Another object of the present invention is to provide a device for fixing pipes to supporting structures that allows easy access to the locking bolts in any situation.

Another object of the present invention is to provide a device for fixing pipes to supporting structures that is structurally simple.

Another object of the present invention is to provide a device for fixing pipes to supporting structures that allows easy operations for adjusting the position of said pipe during its arrangement.

This aim and these and other objects, which will become better apparent hereinafter, are achieved by a device for fixing pipes to supporting structures, characterized in that it comprises two substantially C-shaped circular arc-like strips, which are mutually oppositely coupled so as to surround mutually opposite portions of the pipe to be fixed to the supporting structure, and a bracket, to be fixed to the supporting structure, which is provided with two mutually opposite cantilevered wings, respective first ends of said circular arc-like strips being engaged on the facing portions of the free ends of said two cantilevered wings, a tooth being provided on each of said first ends, said tooth protruding toward the outside of the space that can be occupied by the pipe, said tooth being arranged in abutment against a corresponding engagement portion provided on a respective one of said wings, each of said circular arc-like contoured strips having, at a second end, a perforated portion for the insertion of a bolt for connection to the corresponding perforated portion of the mutually opposite strip on which it is formed.

BRIEF DESCRIPTION OF THE DRAWINGS

Further characteristics and advantages of the invention will become better apparent from the following detailed description of a preferred but not exclusive embodiment thereof, illustrated by way of non-limiting example in the accompanying drawings, wherein:

FIG. 1 is a side view of a fixing device according to the invention, partially tightened and with the pipe to be fixed inserted therein;

FIG. 2 is a side view of a plurality of fixing devices according to the invention as in FIG. 1, arranged in a compact parallel configuration;

Figure 3:
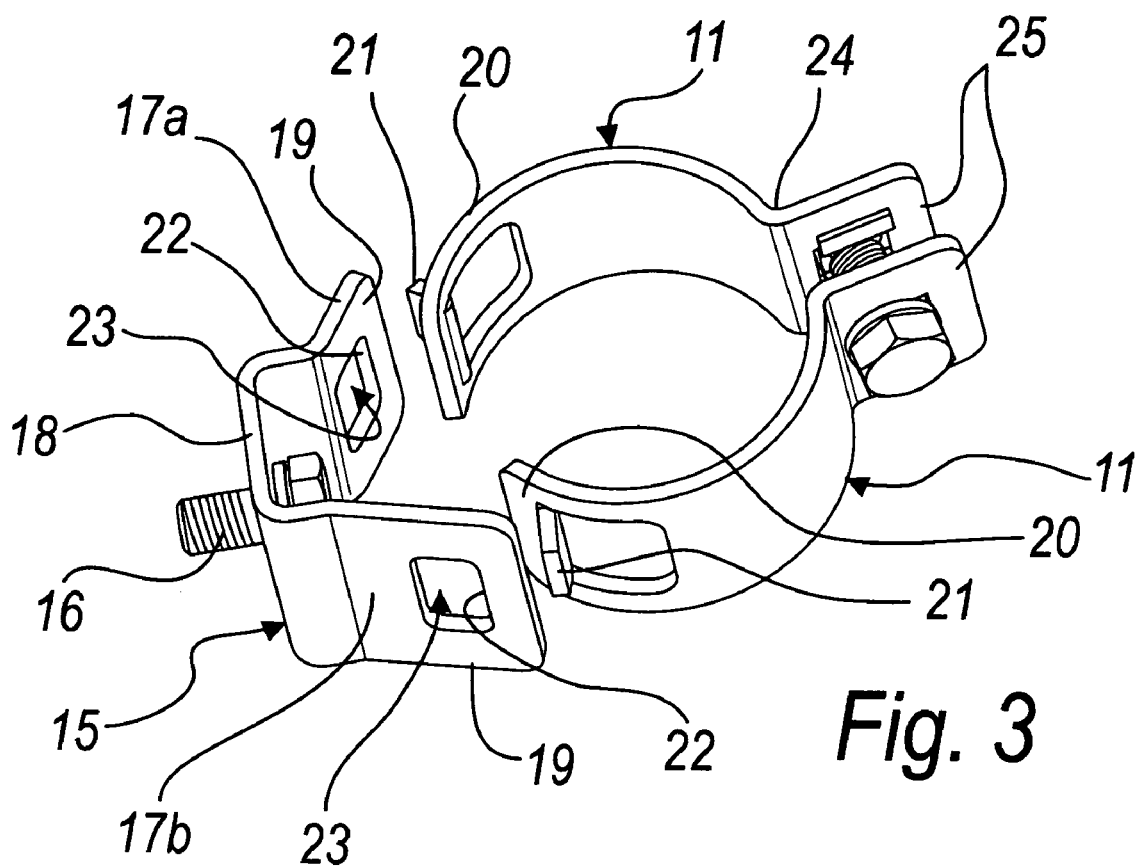
FIG. 3 is an axonometric view of the device of FIG. 1, separated into two parts, one for bracketing to the supporting structure and one for securing the pipe.

It should be noted that everything that is found to be already known during the patenting process is understood not to be claimed and to be the subject of a disclaimer.

DESCRIPTION OF THE PREFERRED EMBODIMENTS

With reference to the figures, a device for fixing pipes to supporting structures according to the invention is generally designated by the reference numeral 10.

The fixing device 10 comprises two circular arched strips 11, which are substantially C-shaped and are mutually oppositely coupled so as to surround mutually opposite portions of the pipe 13 to be fixed to the supporting structure, such as an upright 14, which rests against a wall.

The device 10 further comprises a bracket 15 to be fixed to the supporting structure; in this embodiment, the bracket 15 is fixed to the upright 14 by means of a bolting assembly 16 (only the screw of the bolt is shown in the figures).

The bracket 15 has two mutually opposite cantilevered wings 17a and 17b; in particular, the cantilevered wings 17 protrude from the ends of a perforated base 18, through which the screw of the bolting assembly 16 is arranged.

Of these cantilevered wings, a first wing 17a is inclined more and is shorter than the second wing 17b; the bracket 15 therefore assumes an asymmetrical configuration with respect to the axis of the bolting assembly 16.

Respective first ends 20 of the circular arc-like strips 11 are engaged on the facing portions of the free ends 19 of the two cantilevered wings 17.

In particular, proximate to each of the first ends 20 there is a tooth 21, which protrudes toward the outside of the space that can be occupied by the pipe 13 and is arranged in abutment against a corresponding engagement portion 22 formed on a respective cantilevered wing 17.

In particular, the engagement portion 22 corresponds to the internal rim of a hole 23, which has a quadrangular contour and is formed in each cantilevered wing 17.

Each circular arc-like strip 11 has, at a second end 24, a flat perforated portion 25 for the insertion of a bolt 26 for connection to the corresponding perforated portion 25 of the mutually opposite strip 11 in which it is provided.

Figure 4:
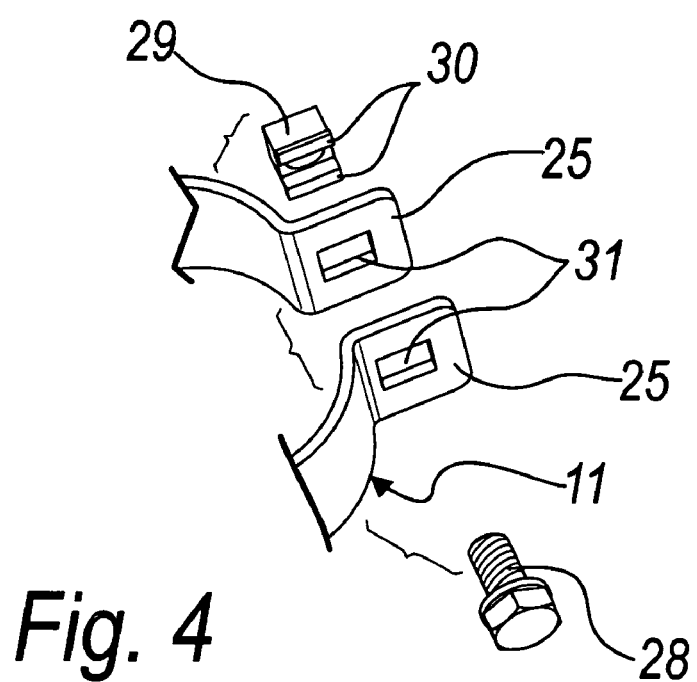
FIG. 4 is an exploded axonometric view of a detail of the device of FIG. 1.

In particular, the bolt 26 is composed of a screw 28 and a square nut 29 (of the "cage nut" type); said nut has two mutually opposite abutment portions 30 for stable engagement against the rim of the through hole 31 formed in each perforated portion 25; the hole 31 is shaped complementary with respect to the square nut 29, as clearly shown in FIG. 4.

Conveniently, for production reasons, the two strips 11 are identical.

The identical nature of the strips 11 and the asymmetry of the bracket 15 cause the axis of the bolt 26 to be not perpendicular to the axis of the bolting assembly 16 and to be therefore inclined with respect to the base 18 that rests on the upright 14.

The device is fitted as follows.

The bracket 15 is fixed to the upright 14 after aligning it to size.

The two strips 11 are then arranged so as to surround the pipe 13, tightening the bolt 26 so as to leave play between the strips and the pipe.

A tooth 21 is then inserted in the engagement portion 22 related to the first wing 17a and then the other tooth 21 is inserted in the engagement portion 22 related to the second wing 17b.

As this point, the bolt 26 is tightened slightly, producing the stable engagement of the teeth 21 in the respective engagement portions 22.

Figure 5:
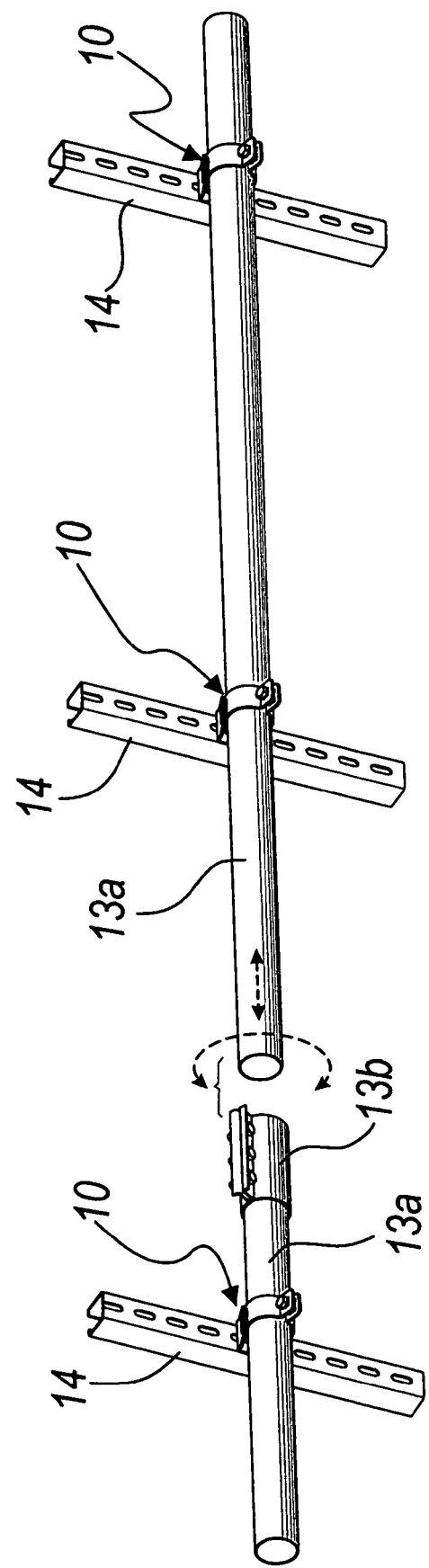
FIG. 5 is an axonometric view of a pipe supported by a plurality of fixing devices according to the invention, illustrating the moment of the coupling of two portions of pipe.

The pipe is clamped to a minimal extent due to the asymmetry of the securing action; for this reason, it is possible to move and turn the pipe 13 in order to position it or join it correctly to an adjacent pipe 13a, as clearly shown in FIG. 5, by way of a union 13b.

Then, once the pipe has been positioned correctly, the bolt 26 is tightened further.

The fact that the two strips are shaped like a circular arc avoids deformation of the pipe when the strips clamp it.

Said pipe, as described earlier, has its axis inclined with respect to the axis along which the bracket is fixed to the upright and therefore is easily accessible for the head of a power screwdriver or for a socket wrench.

In practice it has been found that the invention thus described solves the problems noted in known types of device for fixing pipes to supporting structures; in particular, the present invention provides a device for fixing pipes to supporting structures that is capable of providing effective locking without deforming the pipes to which they are applied.

This has been achieved by providing locking by means of two mutually opposite circular arc portions, which do not compress asymmetrically said pipe.

Moreover, the present invention provides a device for fixing pipes to supporting structures that allows a compact arrangement of a plurality of pipes arranged in parallel.

The present invention in fact avoids the provision of lateral portions for fixing the strips, which increase the lateral space occupation thereof, forcing larger center distances for the mounting of pipes arranged side by side.

Further, the present invention provides a device for fixing pipes to supporting structures that allows, in any situation, easy access to the locking bolts.

The axis of the locking bolt, as shown, is in fact inclined and therefore accessible to a power screwdriver.

Moreover, the present invention provides a device for fixing pipes to supporting structures that is structurally simple and allows easy operations for adjusting the position of said pipe during its arrangement.

It should be noted that the fact of having a fixing of the device 10 to the upright 14 (the bracket 15) that is independent of the pipe fixing seat allows to fix the bracket so as to position the pipe so that it is inclined in a preferred direction with respect to said upright.

The invention thus conceived is susceptible of numerous modifications and variations, all of which are within the scope of the appended claims; all the details may further be replaced with other technically equivalent elements.

In practice, the materials employed, so long as they are compatible with the specific use, as well as the dimensions, may be any according to requirements and to the state of the art.

The disclosures in Italian Patent Application No. PD2005A000248 from which this application claims priority are incorporated herein by reference.

What is claimed is:

1. A device for fixing a pipe to a supporting structure, comprising: two C-shaped circular arched strips having respective first and second free ends and which are detachably coupled oppositely to each other at said respective first and second free ends thereof so as to surround mutually opposite portions of a pipe to be fixed to the a supporting structure; a bracket, adapted to be fixed to the supporting structure, said bracket being provided with two mutually opposite cantilevered wings that have free ends, the respective first free ends of said circular arched strips being engaged on facing portions of said free ends of said two cantilevered wings; teeth provided one on each of said first free ends of said arched strips and protruding away from a space between said two opposite wings that is to be occupied by the pipe, said teeth being arranged in abutment against respective, corresponding engagement portions provided each on a respective one of said two cantilevered wings, each one of said circular arched strips having the second free end thereof provided with a respective perforated portion; and a bolt adapted to be inserted through the perforated portions of each of the mutually opposite arched strips for connecting together said opposite arched strips.

2. The fixing device of claim 1, wherein said bracket has a perforated base and is provided with a screw of a bolting assembly for fixing to the supporting structure, said two cantilevered wings protruding from ends of said perforated base, through which the screw of the bolting assembly is arranged, and wherein a first wing of said cantilevered wings is provided more inclined and shorter than the second wing, said bracket assuming upon fixing to the supporting structure an asymmetrical configuration with respect to an axis of said bolting assembly.

3. The fixing device of claim 2, wherein said two circular arched strips are substantially mutually identical, an axis of said bolt as arranged between said perforated portions of said circular arched strips being inclined with respect to the axis of said bolting assembly for fixing to the supporting structure.

4. The fixing device of claim 3, wherein the axis of said bolt is inclined with respect to the perforated base of said bracket as resting against the supporting structure.

5. The fixing device of claim 2, wherein each one of said cantilevered wings has a respective hole with an internal rim, each one of said engagement portions corresponding to the internal rim of said respective hole provided in each said cantilevered wing.

6. The fixing device of claim 2, wherein said perforated portions are each provided wit a through hole with a rim thereof, said bolt being composed of a screw and a nut, said nut having a polygonal contour and two mutually opposite abutment portions for stable engagement against the rim of said through hole formed in each of said perforated portions, said through hole being shaped complementarily with respect to said nut.

7. A device for fixing a pipe to a supporting structure, comprising: two C-shaped circular arched snips, which are detachably coupled oppositely to each other so as to surround mutually opposite portions of a pipe to be fixed to a supporting structure; a bracket, adapted to be fixed to the supporting structure, said bracket being provided wit two mutually opposite cantilevered wings that have free ends, respective first ends of said circular arched strips being engaged on facing portions of said free ends of said two cantilevered wings; teeth provided one on each of said first ends of said arched strips and protruding away from a space between said two opposite wings that is to be occupied by the pipe, said teeth being arranged in abutment against respective, corresponding engagement portions provided each on a respective one of said two cantilevered wings, each one of said circular arched snips having a second end thereof provided with a respective perforated portion; and a bolt adapted to be inserted through the perforated portions of each of the mutually opposite arched strips for connecting together said apposite arched snips; wherein said bracket has a perforated base and is provided with a screw of a bolting assembly for fixing to the supporting structure, said two cantilevered wings protruding from ends of said perforated base, through which the screw of the bolting assembly is arranged, and wherein a first wing of said cantilevered wings is provided more inclined and shorter than the second wing, said bracket assuming upon fixing to the supporting structure an asymmetrical configuration with respect to an axis of said bolting assembly.

8. A device for fixing a pipe to a supporting structure, comprising: two C-shaped circular arched strips, which are detachably coupled oppositely to each other so as to surround mutually opposite portions of a pipe to be fixed to a supporting structure; a hacker, adapted to be fixed to the supporting structure, said bracket being provided with two mutually opposite cantilevered wings that have free ends, respective first ends of said circular arched strips being engaged on facing portions of said free ends of said two cantilevered wings; teeth provided one on each of said first ends of said arched strips and protruding away from a space between said two opposite wings that is to be occupied by the pipe, said teeth being arranged in abutment against respective, corresponding engagement portions provided each on a respective one of said two cantilevered wings, each one of said circular arched strips having a second end thereof provided with a respective perforated portion; and a bolt adapted to be inserted through the perforated portions of each of the mutually opposite arched strips for connecting together said opposite arched strips; wherein said bracket has a perforated base and is provided with a screw of a bolting assembly for fixing to the supporting structure, said two cantilevered wings protruding from ends of said perforated base through which the screw of the bolting assembly is arranged with a first wing whereof that is provided more inclined and shorter than the second wing, said bracket assuming upon fixing to the supporting structure an asynunenical configuration with respect to an axis of said bolting assembly, and wherein said two circular arched strips are substantially mutually identical, an axis of said bolt as arranged between said perforated portions of said circular arched strips being inclined with respect to the axis of said bolting assembly for fixing to the supporting structure.

* * * * *